Patented Dec. 27, 1938

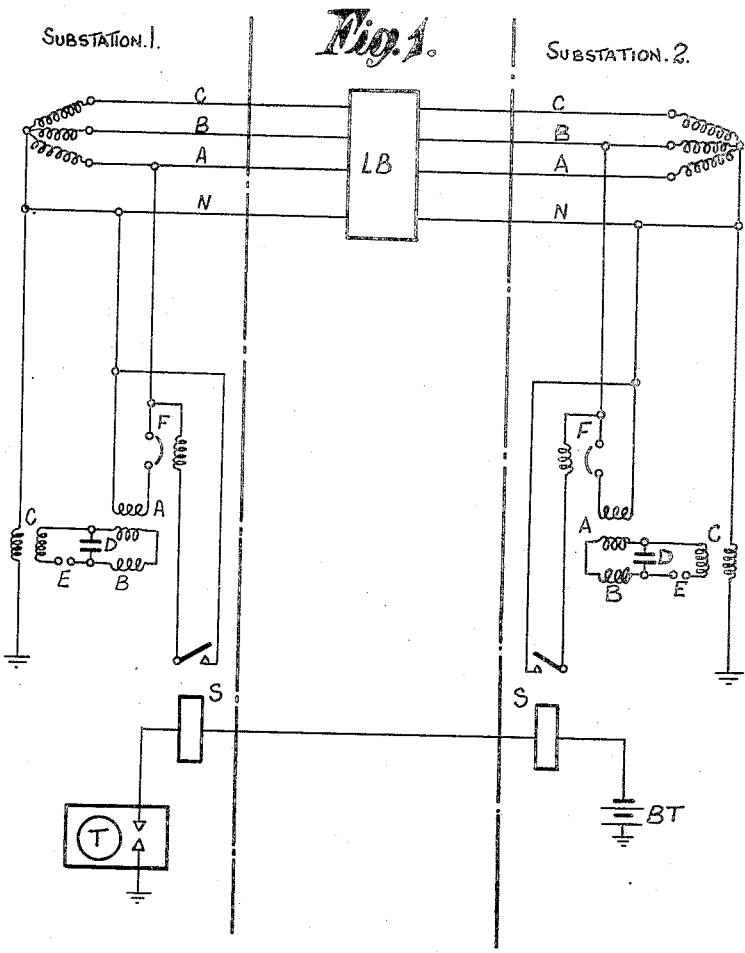
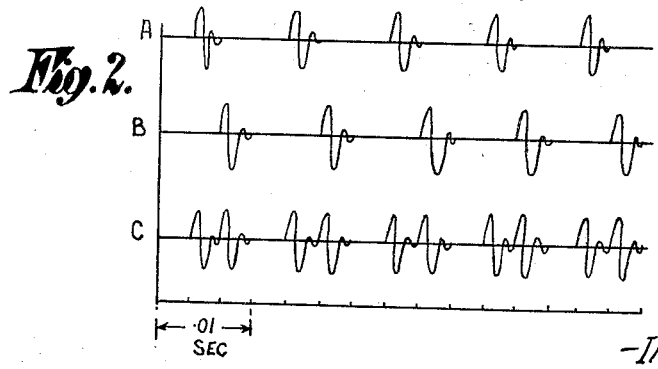

2,141,489

UNITED STATES PATENT OFFICE 2,141,489

HIGH FREQUENCY CURRENT GENERATING AND DISTRIBUTION SYSTEM

Philip Norton Roseby, Woodvale, near Southport, England, assignor to Associated Telephone and Telegraph Company, Chicago, Ill., a corporation of Delaware Application November 13, 1936, Serial No. 110,674
In Great Britain December 17, 1935

9 Claims. (Cl. 171—97)

The present invention relates to high frequency current generating and distributing systems and is more particularly concerned with systems in which transmission is effected over the conductors of a three-phase alternating current supply network by the use of high frequency currents superimposed thereon. This may be effected for instance by providing means at a substation for applying high frequency currents to the primary of a transformer having a very low resistance secondary which is included in the lead by which the neutral is earthed and in this case the responding devices would be connected between the neutral and earth. Although an arrangement in this simple form gives satisfactory results in most cases, it sometimes happens in localities where substations are linked together that the attenuation of the network becomes too high for the high frequency current from a single substation to effect the reliable operation of responding devices which are situated at a considerable distance from the substation in which the high frequency generator is located.

The most straightforward solution to this difficulty is to provide additional high frequency generators distributed over the linked network but if the proper advantages are to be obtained from this arrangement it is important that there must be no interference between the outlets of two generators at a responding device which is within the range of both. The chief object of the present invention is to provide improved arrangements for signalling over alternating current supply mains using two or more high frequency generators which may be controlled simultaneously without interference and without special steps being taken to maintain their outputs in phase.

According to one feature of the invention in an electrical signalling system employing high frequency current transmitted over the neutral or phase conductors of a polyphase supply network, a section of the network is supplied from a plurality of high frequency generators operating simultaneously, interference being prevented by arranging that the output of each generator is intermittent and the various generators have a phase displacement so that no two are transmitting high frequency current simultaneously.

According to another feature of the invention in an electrical signalling system employing high frequency current transmitted over the neutral or phase conductors of a polyphase supply network, the high frequency current is supplied from a plurality of generators operating simultaneously, the output of each generator being intermittent and displaced in phase from that of the other generators so that the high frequency current supply to the network is substantially continuous while transmission is taking place.

A further feature of the invention is that in an electrical signalling system employing high frequency current transmitted over the neutral or phase conductors of a polyphase supply network, a plurality of high frequency generators fed from the network and supplying high frequency current for a fraction only of each half wave of the supply are energized substantially simultaneously from different phases of the supply and serve to feed high frequency current to different points in the same network without interference.

The invention will be better understood from the following description of one method of carrying it into effect, reference being had to the accompanying drawing comprising Figs. 1 and 2, of which Fig. 1 is a circuit diagram while Fig. 2 illustrates the time-relation of the currents flowing.

Fig. 1 shows a pair of substations feeding a three phase alternating current supply network and connected together through a link box LB. Conveniently the supply to the consuming devices may be at 230 volts 50 cycles and in the drawing the respective phase leads are marked A, B and C and the neutral lead N. Each of the high frequency generators at the substation is assumed to be of the spark gap type and is energized from a step-up transformer A. The secondary of the transformer A which may generate a pressure of the order of 5000 volts is located in the spark gap circuit which includes choke coil B, condenser D, spark gap E and the primary of the transformer C the secondary of which is located in the earth lead to the system.

It will be readily understood that when the electromagnetic contactor F is closed in the manner to be described, the spark gap comes into operation to produce a high frequency current of a frequency of the order of 4000–5000 cycles. This is applied to the earth lead and operates responding devices not shown but assumed to be connected between the neutral conductor and earth at various street lamps and the like connected to the network.

It is well known that a generator of the spark gap type produces a high frequency current of rapidly diminishing amplitude and short duration each half cycle. This occurs 100 times per second with a 50 cycle supply and it has been found that with an arrangement of the type described the duration of the diminishing high frequency current is less than 1/300 of a second on the average network which leaves a period of 2/300 of a second each half cycle during which the distributing network is free from high frequency potential. However, owing to the fact that on a three-phase supply the peak potentials are spaced 120° apart, it is possible by operating a high frequency generator from each of the other two phases to make use of the quiescent interval which occurs when only one generator is used. Obviously an arrangement of this kind does not require that the high frequency currents given out from the spark generators shall be in phase as they give their pulses of high frequency current in succession. Hence it is possible to connect up three generators to different phases at different points on the network and providing they are controlled simultaneously they will augment each other over a greatly extended area. Two generators only could obviously be used if three were considered unnecessary for any particular area.

The outputs from two such generators are given diagrammatically in curves A and B in Fig. 2, while curve C represents the combined output of the two generators when controlled simultaneously.

One method of controlling the high frequency generators simultaneously as shown in the drawing is by means of a pilot wire which often extends between low tension substations. Transmission is initiated at the correct instant by a time switch T adapted to close its contacts for a short period of the order of one second and so complete a circuit for the relays S at each substation in series from the battery BT. The relays S cause the electromagnetic contactors F to close and start up the high frequency generators which are energized from phases A and B respectively. Although pilot wire control is shown, it will be appreciated that other methods could be adopted if desired, for instance synchronous motors might be used or the low tension mains otherwise employed, and in this case there need be no special connection between the substations. It will be appreciated that it is not essential that the high frequency generators should operate absolutely simultaneously so long as their times of operation overlap and there is no discontinuity in the operation of any of the contactors.

I claim:—

1. In a polyphase commercial frequency distribution network, a transmission line comprising a plurality of conductors, a plurality of high frequency generators arranged simultaneously to operate, means for applying the voltage output of said generators to one of said conductors, and means for energizing said generators so that an intermittent high frequency output voltage is produced by each generator which is displaced in phase from the voltage produced by the other generators by an amount sufficient to prevent high frequency voltage from simultaneously being applied to said one conductor by any two of said generators.

2. In a polyphase commercial frequency distribution network, a transmission line comprising a plurality of conductors, a plurality of high frequency generators arranged simultaneously to operate, means for applying the voltage output of said generators to one of said conductors, a supply circuit individual to each of said generators and extending between said line and the associated generator, said supply circuits being so connected and arranged that an intermittent high frequency output voltage is produced by each generator which is displaced in phase from the voltage produced by each of the other generators by an amount sufficient to prevent high frequency voltage from simultaneously being applied to said one conductor by any two of said generators.

3. In a polyphase commercial frequency distribution network, a transmission line comprising a plurality of conductors, a plurality of high frequency generators arranged simultaneously to operate, means for applying the voltage output of said generators to one of said conductors, a supply circuit individual to each of said generators and extending between said line and the associated generator, each of said generators being operative to produce high frequency voltage for a fraction only of each half cycle of the supply voltage, and said circuits being so connected and arranged that the output voltage produced by each generator is displaced in phase from the voltage produced by the other generators by an amount sufficient to prevent high frequency voltage from simultaneously being applied to said one conductor by any two of said generators.

4. In a polyphase commercial frequency distribution network, a transmission line comprising a plurality of conductors, a plurality of high frequency generators arranged simultaneously to operate, means for applying the voltage output of said generators to one of said conductors, a supply circuit individual to each of said generators and extending between said line and the associated generator, each of said generators being operative to produce high frequency voltage for a fraction only of each half cycle of the supply voltage, and said supply circuits including connections to different ones of said conductors, whereby the output voltage produced by each generator is displaced in phase from the voltage produced by each of the other generators by an amount sufficient to prevent high frequency voltage from simultaneously being applied to said one conductor by any two of said generators.

5. In a system for generating high frequency currents, a plurality of high frequency generators, and means for energizing said generators so that an intermittent high frequency output voltage is produced by each generator which is displaced in phase from the voltage produced by each of the other generators by an amount sufficient to prevent high frequency voltage from simultaneously being produced by any two of said generators.

6. In a system for generating high frequency currents, a plurality of high frequency generators, each adapted to be energized from a commercial frequency source and each being operative to generate high frequency voltage for a fraction only of each half cycle of the supply voltage, and means including a commercial frequency current source for energizing said generators so that the output voltage produced by each generator is displaced in phase from that produced by each of the other generators by an amount sufficient to prevent high frequency voltage from simultaneously being produced by any two of said generators.

7. In a system for generating high frequency currents and including a plurality of high frequency generators, each adapted to produce a voltage pulse for each half cycle of input current supplied thereto having a duration equal only to a fraction of the time interval of said half cycle, the method of operation which comprises the step of supplying input voltage successively to said generators at periods spaced by intervals equal to said fraction of the time interval of said half cycle.

8. In a polyphase commercial frequency distribution network, a transmission line comprising a plurality of conductors, a plurality of high frequency generators, means for applying the voltage output of said generators to one of said conductors, a supply circuit individual to each of said generators and extending between said line and the associated generator, each of said generators being operative to produce high frequency voltage for a fraction only of each half cycle of the supply voltage, and said circuits being so connected and arranged that the output voltage produced by each generator is displaced in phase from the voltage produced by the other generators by an amount sufficient to prevent high frequency voltage from simultaneously being applied to said one conductor by any two of said generators, and means for simultaneously completing the supply circuits for said generators.

9. In a polyphase commercial frequency distribution network, a transmission line comprising a plurality of conductors, a plurality of high frequency generators, means for applying the voltage output of said generators to one of said conductors, a supply circuit individual to each of said generators and extending between said line and the associated generator, each of said generators being operative to produce high frequency voltage for a fraction only of each half cycle of the supply voltage, and said circuits being so connected and arranged that the output voltage produced by each generator is displaced in phase from the voltage produced by the other generators by an amount sufficient to prevent high frequency voltage from simultaneously being applied to said one conductor by any two of said generators, a relay associated with each of said supply circuits and operative to complete the associated circuit, a common operating circuit for said relays, and means for completing said common operating circuit.

PHILIP NORTON ROSEBY.